United States Patent
Jin et al.

(10) Patent No.: US 7,883,002 B2
(45) Date of Patent: Feb. 8, 2011

(54) AUTOMATED LISTING MANAGEMENT

(75) Inventors: Hua-Ming Jin, Lexington, MA (US);
Matthew Ackley, Rowley, MA (US);
Ken Lin, Jamaica Plain, MA (US)

(73) Assignee: eBay Inc., San Jose, CA (US)

( * ) Notice: Subject to any disclaimer, the term of this patent is extended or adjusted under 35 U.S.C. 154(b) by 781 days.

(21) Appl. No.: 10/201,586

(22) Filed: Jul. 22, 2002

(65) Prior Publication Data
US 2005/0033648 A1    Feb. 10, 2005

Related U.S. Application Data

(60) Provisional application No. 60/306,828, filed on Jul. 20, 2001.

(51) Int. Cl.
*G06Q 10/00* (2006.01)
(52) U.S. Cl. ................................ 235/376; 705/28
(58) Field of Classification Search ............... 705/22, 705/28; 700/99, 106; 235/375, 376, 385
See application file for complete search history.

(56) References Cited

U.S. PATENT DOCUMENTS

| | | | |
|---|---|---|---|
| 4,992,940 A | 2/1991 | Dworkin | |
| 5,404,528 A | 4/1995 | Mahajan | |
| 5,640,569 A | 6/1997 | Miller et al. | |
| 5,652,850 A | 7/1997 | Hollander | |
| 5,664,111 A | 9/1997 | Nahan et al. | |
| 5,701,137 A | 12/1997 | Kiernan et al. | |
| 5,710,887 A * | 1/1998 | Chelliah et al. | 705/26 |
| 5,784,539 A * | 7/1998 | Lenz | 706/45 |
| 5,809,242 A | 9/1998 | Shaw et al. | |
| 5,835,896 A | 11/1998 | Fisher et al. | |
| 5,845,265 A | 12/1998 | Woolston | |
| 5,890,138 A | 3/1999 | Godin et al. | |
| 5,894,554 A | 4/1999 | Lowery et al. | |
| 5,924,077 A * | 7/1999 | Beach et al. | 705/10 |
| 5,978,811 A * | 11/1999 | Smiley | 1/1 |
| 5,983,199 A | 11/1999 | Kaneko | |
| 5,991,739 A | 11/1999 | Cupps et al. | |
| 6,021,398 A | 2/2000 | Ausubel | |

(Continued)

FOREIGN PATENT DOCUMENTS

CA    2277848    10/1998

(Continued)

OTHER PUBLICATIONS

"Mercata—Group Buying Power", http://mercata.com, (Downloaded August 9, 2006).

(Continued)

*Primary Examiner*—Andrew Joseph Rudy
(74) *Attorney, Agent, or Firm*—Schwegman, Lundberg & Woessner, P.A.

(57) ABSTRACT

Disclosed is a sales system for lots of items that includes business rule definition logic. The sales system also includes offering creation logic that is operative to dynamically create different offerings for items in the lots. The offering creation logic optimizes return based on one or more of the business rules by using different offering parameter values for the different offerings.

17 Claims, 14 Drawing Sheets

U.S. PATENT DOCUMENTS

| | | | |
|---|---|---|---|
| 6,029,141 A | 2/2000 | Bezos et al. | |
| 6,032,153 A | 2/2000 | Sadiq et al. | |
| 6,041,310 A | 3/2000 | Green et al. | |
| 6,052,667 A | 4/2000 | Walker | |
| 6,055,519 A | 4/2000 | Kennedy et al. | |
| 6,058,417 A | 5/2000 | Hess et al. | |
| 6,064,981 A | 5/2000 | Barni et al. | |
| 6,101,484 A | 8/2000 | Halbert et al. | |
| 6,119,152 A | 9/2000 | Carlin et al. | |
| 6,125,352 A | 9/2000 | Franklin et al. | |
| 6,182,053 B1 | 1/2001 | Rauber et al. | |
| 6,202,051 B1 | 3/2001 | Woolston | |
| 6,243,691 B1 | 6/2001 | Fisher et al. | |
| 6,253,188 B1 | 6/2001 | Witek et al. | |
| 6,260,024 B1 | 7/2001 | Shkedy | |
| 6,263,341 B1* | 7/2001 | Smiley | 1/1 |
| 6,266,651 B1 | 7/2001 | Woolston | |
| 6,269,343 B1 | 7/2001 | Pallakoff | |
| 6,272,472 B1 | 8/2001 | Danneels et al. | |
| 6,285,989 B1 | 9/2001 | Shoham | |
| 6,295,058 B1 | 9/2001 | Hsu et al. | |
| 6,304,855 B1 | 10/2001 | Burke | |
| 6,314,424 B1 | 11/2001 | Kaczmarski et al. | |
| 6,332,124 B1* | 12/2001 | Loeb et al. | 705/1 |
| 6,356,878 B1 | 3/2002 | Walker et al. | |
| 6,356,909 B1 | 3/2002 | Spencer | |
| 6,374,229 B1* | 4/2002 | Lowrey et al. | 705/34 |
| 6,393,427 B1 | 5/2002 | Vu et al. | |
| 6,401,080 B1 | 6/2002 | Bigus et al. | |
| 6,415,270 B1 | 7/2002 | Rackson et al. | |
| 6,434,536 B1 | 8/2002 | Geiger | |
| 6,473,748 B1* | 10/2002 | Archer | 706/45 |
| 6,484,149 B1 | 11/2002 | Jammes et al. | |
| 6,496,568 B1 | 12/2002 | Nelson | |
| 6,564,192 B1 | 5/2003 | Kinney, Jr. et al. | |
| 6,584,451 B1 | 6/2003 | Shoham et al. | |
| 6,587,837 B1* | 7/2003 | Spagna et al. | 705/26 |
| 6,598,026 B1 | 7/2003 | Ojha et al. | |
| 6,606,608 B1 | 8/2003 | Bezos et al. | |
| 6,611,881 B1* | 8/2003 | Gottfurcht et al. | 710/18 |
| 6,658,568 B1* | 12/2003 | Ginter et al. | 713/193 |
| 6,671,358 B1* | 12/2003 | Seidman et al. | 379/93.12 |
| 6,671,818 B1* | 12/2003 | Mikurak | 714/4 |
| 6,704,713 B1 | 3/2004 | Brett | |
| 6,731,729 B2* | 5/2004 | Eng et al. | 379/121.03 |
| 6,754,181 B1* | 6/2004 | Elliott et al. | 370/252 |
| 6,868,413 B1* | 3/2005 | Grindrod et al. | 706/59 |
| 6,910,028 B2* | 6/2005 | Chan et al. | 706/47 |
| 7,020,632 B1* | 3/2006 | Kohls et al. | 705/37 |
| 7,039,594 B1* | 5/2006 | Gersting | 705/7 |
| 7,039,608 B2* | 5/2006 | Johnson et al. | 705/36 R |
| 7,039,875 B2 | 5/2006 | Khalfay et al. | |
| 7,062,756 B2* | 6/2006 | Kamen et al. | 717/127 |
| 7,110,967 B1 | 9/2006 | Espenes et al. | |
| 7,120,629 B1* | 10/2006 | Seibel et al. | 707/5 |
| 7,130,807 B1* | 10/2006 | Mikurak | 705/7 |
| 7,133,834 B1* | 11/2006 | Abelow | 705/10 |
| 7,149,698 B2* | 12/2006 | Guheen et al. | 705/1 |
| 7,165,041 B1 | 1/2007 | Guheen et al. | 705/26 |
| 7,185,044 B2* | 2/2007 | Ryan et al. | 709/200 |
| 7,188,080 B1* | 3/2007 | Walker et al. | 705/26 |
| 7,188,091 B2* | 3/2007 | Huelsman et al. | 706/47 |
| 7,249,044 B2* | 7/2007 | Kumar et al. | 705/8 |
| 7,249,055 B1 | 7/2007 | Elder | |
| 7,289,964 B1* | 10/2007 | Bowman-Amuah | 705/1 |
| 7,308,423 B1* | 12/2007 | Woodward et al. | 705/26 |
| 7,315,826 B1* | 1/2008 | Guheen et al. | 705/7 |
| 7,363,246 B1 | 4/2008 | Van et al. | |
| 7,505,932 B2* | 3/2009 | Kemp et al. | 705/35 |
| 7,509,283 B2* | 3/2009 | Friesen et al. | 705/37 |
| 7,558,752 B1 | 7/2009 | Ephrati et al. | |
| 7,587,350 B1* | 9/2009 | Stewart et al. | 705/36 R |
| 2001/0032170 A1 | 10/2001 | Sheth | |
| 2001/0043595 A1 | 11/2001 | Aravamudan et al. | |
| 2001/0047308 A1 | 11/2001 | Kaminsky et al. | |
| 2001/0051932 A1 | 12/2001 | Srinivasan et al. | |
| 2005/0114229 A1 | 5/2005 | Ackley et al. | |
| 2006/0129476 A1 | 6/2006 | Chin et al. | |
| 2007/0112645 A1 | 5/2007 | Traynor et al. | |
| 2008/0133426 A1 | 6/2008 | Porat et al. | |

FOREIGN PATENT DOCUMENTS

| | | | |
|---|---|---|---|
| CA | 2349913 | | 2/2000 |
| CA | 2377939 | | 12/2000 |
| EP | 1001355 | A2 | 5/2000 |
| WO | WO-9914688 | A2 | 3/1999 |
| WO | WO-0042558 | A2 | 7/2000 |

OTHER PUBLICATIONS

"Onedayfree-B2B product exchange powered by the Dynamic Price Calendar Auction", http://www.onedayfree.com, Downloaded from http://web.archive.org/web/20001007030239/http://www.onedayfree.com/,(2000).

"Priceline.com AirlineTickets", http://www.pricline.com/travel/airlines, (Downloaded Aug. 9, 2006).

"Amazon.com: http://www.amazon.com/Carbohydrate-Additcs-Lifespan-Parogram-personalized/dp/0525941", (Jan. 1, 2007).

"U.S. Appl. No. 09/686,073, Response filed Jul. 31, 2007 to Non-Final Office Action mailed May 8, 2007", 16 pgs.

"U.S. Appl. No. 09/441,388, Amendment filed with RCE Nov. 1, 2007", 15 pgs.

"U.S. Appl. No. 09/441,388 Advisory Action mailed Jan. 2, 2004", 3 pgs.

"U.S. Appl. No. 09/441,388 Advisory Action mailed Dec. 12, 2005", 3 pgs.

"U.S. Appl. No. 09/441,388 Final Office Action mailed Feb. 6, 2004", 8 pgs.

"U.S. Appl. No. 09/441,388 Final Office Action mailed Aug. 10, 2005", 9 pgs.

"U.S. Appl. No. 09/441,388 Non Final Office Action mailed Jun. 14, 2004", 9 pgs.

"U.S. Appl. No. 09/441,388 Response filed May 6, 2004 to Final Office Action mailed Feb. 6, 2004", 11 pgs.

"U.S. Appl. No. 09/441,388 Response filed Sep. 13, 2004 to Non Final Office Action mailed Jun. 14, 2004", 11 pgs.

"U.S. Appl. No. 09/441,388 Response filed Nov. 4, 2005 to Final Office Action mailed Aug. 10, 2005", 10 pgs.

"U.S. Appl. No. 09/441,388 Response filed Dec. 12, 2003 to Final Office Action mailed Jun. 23, 2003", 5 pgs.

"U.S. Appl. No. 09/685,449, Non-Final Office Action mailed Sep. 24, 2007", 7 pgs.

"U.S. Appl. No. 09/685,449 Advisory Action mailed Sep. 12, 2006", 3 pgs.

"U.S. Appl. No. 09/685,449 Final Office Action mailed Jan. 4, 2005", 8 pgs.

"U.S. Appl. No. 09/685,449 Final Office Action mailed Jun. 20, 2006", 16 pgs.

"U.S. Appl. No. 09/685,449 Non Final Office Action mailed Mar. 2, 2006", 4 pgs.

"U.S. Appl. No. 09/685,449 Non Final Office Action mailed Jun. 14, 2004", 9 pgs.

"U.S. Appl. No. 09/685,449 Non Final Office Action mailed Sep. 19, 2005", 16 pgs.

"U.S. Appl. No. 09/685,449 Response filed Mar. 1, 2005 to Final Office Action mailed Jan. 4, 2005", 18 pgs.

"U.S. Appl. No. 09/685,449 Response filed Aug. 21, 2006 to Final Office Action mailed Jun. 20, 2006", 13 pgs.

"U.S. Appl. No. 09/685,449 Response filed Sep. 27, 2004 to Non Final Office Action mailed Jun. 14, 2004", 13 pgs.

"U.S. Appl. No. 09/685,449 Response filed Nov. 30, 2005 to Non Final Office Action mailed Sep. 19, 2005", 12 pgs.

"U.S. Appl. No. 09/686,073, Final Office Action mailed Nov. 5, 2007", 13 pgs.

"U.S. Appl. No. 09/686,073 Advisory Action mailed Apr. 12, 2005", 2 pgs.

"U.S. Appl. No. 09/686,073 Final Office Action mailed Feb. 6, 2006", 15 pgs.

"U.S. Appl. No. 09/686,073 Non Final Office Action mailed Mar. 29, 2004", 11 pgs.

"U.S. Appl. No. 09/686,073 Non Final Office Action mailed May 8, 2007", 23 pgs.

"U.S. Appl. No. 09/686,073 Non Final Office Action mailed Aug. 12, 2005", 12 pgs.

"U.S. Appl. No. 09/686,073 Non Final Office Action mailed Oct. 5, 2006", 12 pgs.

"U.S. Appl. No. 09/686,073 Non Final Office Action mailed Nov. 5, 2004", 8 pgs.

"U.S. Appl. No. 09/686,073 Response filed Jan. 25, 2007 to Non Final Office Action mailed Oct. 5, 2006", 14 pgs.

"U.S. Appl. No. 09/686,073 Response filed Mar. 24, 2005 to Non Final Office Action mailed Nov. 5, 2004", 8 pgs.

"U.S. Appl. No. 09/686,073 Response filed Jul. 29, 2004 to Non Final Office Action mailed Mar. 29, 2004", 10 pgs.

"U.S. Appl. No. 09/686,073 Response filed Nov. 14, 2005 to Non Final Office Action mailed Aug. 12, 2005", 9 pgs.

"U.S. Appl. No. 11/352,173 Non Final Office Action mailed Jun. 22, 2007", 7 pgs.

"U.S. Appl. No. 11/352,173 Response filed Aug. 30, 2007 to Non Final Office Action mailed Jun. 22, 2007", 8 pgs.

"Australian Application No. 2002355130 First Office Action and communication regarding same", 1 pg.

"U.S. Appl. No. 09/441,388, Final Office Action Mailed Oct. 21, 2008", 12 pgs.

"U.S. Appl. No. 09/441,388, Response filed Jul. 8, 2008 to Non-Final Office Action mailed Feb. 8, 2008", 22 pgs.

"U.S. Appl. No. 09/441,388, Response filed Jan. 21, 2009 to Final Office Action mailed Oct. 21, 2008", 16 pgs.

"U.S. Appl. No. 09/441,388, Non-Final Office Action Mailed Feb. 8, 2008", 3 pgs.

"U.S. Appl. No. 09/685,449, Response filed Jan. 24, 2008 to Non-Final Office Action mailed Sep. 24, 2007", 12 pgs.

"U.S. Appl. No. 09/685,449, Restriction Requirement mailed May 13, 2008", 7 pgs.

"U.S. Appl. No. 09/686,073, Response filed Jan. 8, 2008 to Final Office Action mailed Nov. 5, 2007", 10 pgs.

"U.S. Appl. No. 09/686,073, Response filed Jun. 17, 2008 to Non-Final Office Action mailed Mar. 17, 2008", 10 pgs.

"U.S. Appl. No. 09/686,073, Restriction Requirement mailed Mar. 5, 2009", 6 pgs.

"U.S. Appl. No. 09/686,073, Non-Final Office Action mailed Mar. 17, 2008", OARN, 24 pgs.

"U.S. Appl. No. 11/027,735, Notice of Allowance mailed Apr. 3, 2008", NOAR, 7 pgs.

"U.S. Appl. No. 11/027,735, Response filed Jan. 2, 2009 to Non-Final Office Action mailed Oct. 2, 2008", 8 pgs.

"U.S. Appl. No. 11/027,735, Non- Final Office Action mailed Oct. 2, 2008", 7 pgs.

"U.S. Appl. No. 11/352,173, Response filed Dec. 17, 2007 to Restriction Requirement mailed Nov. 15, 2007", 6 pgs.

"U.S. Appl.l No. 11/352,173, Restriction Requirement mailed Nov. 15, 2007", 7 pgs.

"U.S. Appl. No. 11/648,307, Response filed Nov. 11, 2008 to Non-Final Office Action mailed Aug. 25, 2008", 9 pgs.

"U.S. Appl. No. 11/648,307, Preliminary Amendment mailed Dec. 29, 2006", 3 pgs.

"U.S. Appl. No. 11/648,307, Response filed Apr. 17, 2008 to Restriction Requirement mailed Mar. 17, 2008", 6 pgs.

"U.S. Appl. No. 11/648,307, Restriction Requirement mailed Mar. 17, 2008", 7 pgs.

"U.S. Appl. No. 11/648,307, Final Office Action mailed Feb. 23, 2009", 10 pgs.

"U.S. Appl. No. 11/648,307, Non-Final Office Action mailed Aug. 25, 2008", 9 pgs.

"Chinese Application No. 02818562.5, Office Action Mailed Dec. 5, 2008", 4 pgs.

"European Application Serial No. 01986779.5, Office Action Mailed Dec. 3, 2008", 9 pgs.

"European Application Serial No. 01986779.5, Supplemental European Search Report mailed Jul. 9, 2008", 3 pgs.

Lucking-Reiley, David, "Auctions On the Internet: What's Being Auctioned, and How?", *JEL: D44 (Auctions)*, (Aug. 14 1999), pp. 1-55.

U.S. Appl. No. 09/441,388 Final Office Action Mailed Oct. 30, 2009, 24 pgs.

U.S. Appl. No. 09/441,388, Appeal Brief filed Jan. 9, 2006, 21 pgs.

U.S. Appl. No. 09/441,388, Examiner's Answer mailed Apr. 5, 2006, 10 pgs.

U.S. Appl. No. 09/441,388, Final Office Action mailed Jun. 23, 2003, 7 pgs.

U.S. Appl. No. 09/441,388, Final Office Action mailed Dec. 31, 2002, 12 pgs.

U.S. Appl. No. 09/441,388, Non Final Office Action mailed Mar. 19, 2009, 21 pgs.

U.S. Appl. No. 09/441,388, Non Final Office Action mailed Jun. 5, 2002, 11 pgs.

U.S. Appl. No. 09/441,388, Response filed Mar. 15, 2005 to Non Final Office Action mailed Jul. 14, 2004, 15 pgs.

U.S. Appl. No. 09/441,388, Response filed May 28, 2003 to Final Office Action mailed Dec. 31, 2002, 7 pgs.

U.S. Appl. No. 09/441,388, Response filed Oct. 7, 2002 to Non Final Office Action mailed Jun. 3, 2002, 7 pgs.

U.S. Appl. No. 09/441,388, Response filed Dec. 30, 2009 to Final Office Action mailed Oct. 30, 2009, 17 pgs.

U.S. Appl. No. 09/441,388, Response filed Jul. 20, 2009 to Non Final Office Action mailed Mar. 19, 2009, 21 pgs.

U.S. Appl. No. 09/685,449 Non-Final Office Action Mailed May 27, 2009, 26 pgs.

U.S. Appl. No. 09/685,449, Response filed Mar. 29, 2006 to Non Final Office Action mailed Mar. 2, 2006, 7 pgs.

U.S. Appl. No. 09/685,449, Response filed Jun. 20 2005 to Restriction Requirement mailed May 19, 2005, 8 pgs.

U.S. Appl. No. 09/685,449, Response filed Aug. 13, 2008 to Restriction Requirement mailed May 13, 2008, 9 pgs.

U.S. Appl. No. 09/685,449, Response filed Oct. 27 2009 to Non Final Office Action mailed May 27, 2009, 11 pgs.

U.S. Appl. No. 09/685,449, Response filed Dec. 12, 2003 to Restriction Requirement mailed Sep. 17, 2003, 10 pgs.

U.S. Appl. No. 09/685,449, Restriction Requirement mailed May 19, 2005, 5 pgs.

U.S. Appl. No. 09/685,449, Restriction Requirement mailed Sep. 17, 2003, 5 pgs.

U.S. Appl. No. 09/686,073, Non-Final Office Action mailed Jun. 30, 2009, 10 pgs.

U.S. Appl. No. 09/686,073, Response filed Apr. 6, 2009 to Restriction Requirement mailed Mar. 5, 2009, 7 pgs.

v No. 09/686,073, Response filed Jul. 6, 2006 to Final Office Action mailed Feb. 6, 2006, 10 pgs.

U.S. Appl. No. 09/686,073, Response filed Nov. 20, 2008 to Non Final Office Action mailed Oct. 21, 2008, 6 pgs.

U.S. Appl. No. 09/686,073, Response filed Dec. 19, 2003 to Restriction Requirement mailed Oct. 3, 2003, 5 pgs.

U.S. Appl. No. 09/686,073, Restriction Requirement mailed Oct. 3, 2003, 4 pgs.

U.S. Appl. No. 11/027,735, Appeal Brief Filed Oct. 14, 2009, 26 pgs.

U.S. Appl. No. 11/027,735, Final Office Action mailed Apr. 14, 2009, 13 pgs.

U.S. Appl. No. 11/027,735, Preliminary Amendment mailed Jan. 26, 2005, 4 pgs.

U.S. Appl. No. 11/027,735, Preliminary Amendment mailed Dec. 30, 2004, 3 pgs.

U.S. Appl. No. 11/352,173, Non Final Office Action mailed May 27, 2009, 15 pgs.

U.S. Appl. No. 11/352,173, Response filed Oct. 27, 2009 to Non Final Office Action mailed May 27, 2009, 10 pgs.

U.S. Appl. No. 11/648,307, Non Final Office Action Mailed Aug. 20, 2009, 10 pgs.

U.S. Appl. No. 11/648,307, Response filed Apr. 23, 2009 to final Office Action mailed Feb, 23, 2009, 9 pgs.

Canadian Application Serial No. 2,455,639, Office Action mailed Jul. 20, 2009, 5 pgs.

Chinese Application Serial No. 02818562.5, Office Action mailed Jun. 19, 2009, 5 pgs.

European Application Serial No. 02752516.1, Office Action mailed Feb. 20, 2009, 3 pgs.

"Ubid.com;", http://www.ubid.com/catedory/listing.aspx?catid=O&uwb=uwb63174&AID=10297033&PID=799335, (Jul. 11,2000), 1-12 Pages.

Anonymous, "Standard on ratio studies", *Assessment Journal*, (1999), 1-74.

Elliott, S R, "Innovative Rate Structures for Electrical Utility peak Load Management: An Experimental Approach", University of Colorado at Boulder, (1990), p. 1.

Ketcham, J, et al., "A Comparison of Posted-Offer and Double-Auction Pricing Institutions", *The Review of Economic Studies*; vol. 51, No. 4, (Oct. 1984), 595-614 Pages.

Rittenhouse, R C, "Action builds on 1990 Clean Air Act compliance", Power Engineering v96, n5, (May 1992), 1-6 Pages.

Timothy, S V, "A model of the Perishable Inventory System with Reference to Consumer-Realized Product Expiration", *The journal of the Operational Research Society*; vol. 45, No. 5, (May 1991), 519-528 Pages.

William Jr., P, et al., "Toy Story", *Barron's*, v79, n52;, (Dec. 27, 1999), 1-4.

\* cited by examiner

| Listing Services | | |
|---|---|---|
| Listings | Products | Extras |
| Mass Upload Listings | Mass Upload Products | Product/Listing Image Upload |
| Place Listings | Add Products | Create a Thumbnail Image |
| Place Listings w/Search | Search Products | Local Merchandising |
| Edit Listings | Delete Products | Featured Listings |
| Re-List | | Email Listings |
| Batch Re-List | | |
| Close Listings | | |

| Business Partner Kiosk Setup | | |
|---|---|---|
| Kiosk Users | Kiosk Header | Kiosk Secure Header |
| Kiosk Fee Schedule | | |

| Surplus Inventory Management System (SIMS) | | |
|---|---|---|
| Mass Upload Listings | Reporting | Manage Business Rules |
| Search Inventory | | |

SKU Search

> Admin Home | SKU Search

You can search for Inventory by specifying one or more of the following criteria. Hitting "Search" without specifying any criteria will bring up all of your inventory

Product Information

| | |
|---|---|
| SKU | [ ] |
| Quantity Available | [ ] to [ ] |
| Created On | [ ] to [ ] (MM/DD/YY) |
| Category | Choose One ▼ |
| Target Cost RecoveryRate | [ ]% to [ ]% |
| Title | [ ] |

Report Layout Information

Show [the first 50 ▼] records.

Sort by [Don't Care ▼]

Show Listing Count: ○ Yes ● No

☐ Send results to a text file.

☐ Create bulk upload spreadsheet.

[ Search ]  [ Reset ]  [ Cancel ]

Business Rules Default
> Admin Home |

Site Level Defaults

Enter Inventory Details

| | | |
|---|---|---|
| Starting Time: | 6 : 00 AM (EDT) | |
| Ending Time: | 10 : 00 PM (EDT) | |
| Bid Increment: | $1 | |
| Opening Bid: | $1 | |
| Duration | 4 | Days |
| Rest Period: | 1 | Number of Days Before re-list of Item |

Category Level Defaults

| | | |
|---|---|---|
| Category:: | Electronics | |
| Starting Time: | 6 : 00 AM (EDT) | |
| Ending Time: | 10 : 00 AM (EDT) | |
| Bid Increment. | $1 | |
| Opening Bid | $1 | |
| Duration | 4 | Days |
| Rest Period: | 1 | Number of Days Before re-list of Item |

[ Submit Setting ]   [ Clear Form ]

Business Rules

› Admin Home | Business Rules

Business Logic | Site Level: Dependant on the margin of the previous listing, the size of the next lot will change by either an absolute number or a relative percent of the pervious lot. Up to 10 rules can be placed for any level.

Business Logic | Site Level

| If cost return falls between... | Change rate to `-4` |
| `0` and `.3` | ⦿ Absolute  ○ Percent |

| If cost return falls between... | Change rate to `-4` |
| `0` and `.3` | ⦿ Absolute  ○ Percent |

| If cost return falls between... | Change rate to `-4` |
| `0` and `.3` | ⦿ Absolute  ○ Percent |

Business Logic | Category Level: Dependant on the margin of the previous listing, the size of the next lot will change by either an absolute number or a relative percent of the pervious lot. Up to 10 rules can be placed for any level.
Note: Category Business Logic settings override Site Level settings for that category.

Business Logic | Category Level

Category: `Electronics ▼`

| If cost return falls between... | Change rate to `-4` |
| `0` and `.3` | ⦿ Absolute  ○ Percent |

| If cost return falls between... | Change rate to `-4` |
| `0` and `.3` | ⦿ Absolute  ○ Percent |

| If cost return falls between... | Change rate to `-4` |
| `0` and `.3` | ⦿ Absolute  ○ Percent |

[ Submit Settings ]   [ Clear Form ]

| If cost return falls between... | Change rate to [0] |
|---|---|
| [0] and [1] | ⦿ Absolute  ○ Percent |

Reporting

> Admin Home | SIMS | Reporting

| Audit Report | Sales Forecast | Exception Report |
|---|---|---|
| Wed, Jun 06, 2001 | Wed, Jun 06, 2001 | Wed, Jun 06, 2001 |
| Tue, Jun 05, 2001 | Tue, Jun 05, 2001 | Tue, Jun 05, 2001 |
| Mon, Jun 04, 2001 | Mon, Jun 04, 2001 | Mon, Jun 04, 2001 |
| Sun, Jun 03, 2001 | Sun, Jun 03, 2001 | Sun, Jun 03, 2001 |
| Sat, Jun 02, 2001 | Sat, Jun 02, 2001 | Sat, Jun 02, 2001 |
| Fri, Jun 01, 2001 | Fri, Jun 01, 2001 | Fri, Jun 01, 2001 |
| Thu, May 31, 2001 | Thu, May 31, 2001 | Thu, May 31, 2001 |
| Historical | Historical | Historical |

FIG. 12 fairmarket | Administration Module

Product Detail

> Admin Home | Product No.67380089

Product Detail

Presario 5410US Minitower

[PRODUCT IMAGE]

| | | | |
|---|---|---|---|
| SKU/Item No. | 2 | Modified On | 3/26/02 10:59 AM |
| Category | Desktops | Modified By | 3402691 |
| Created On | 3/26/02 10:59 AM | View Product Listings | ←64 |
| Created By | 3402691 | Edit Automatic Listing Settings | |
| Relist | No | Quantity | 500 |

Place a Listing

62 → Place Listing on the [-Please Choose One-  ▼] Channel [Submit]

Product Description/Specs

Description — The Compaq Presario™ 5000 Series Internet desktop PC lets you take advantage of all the latest and greatest technologies — at an affordable price. Whether you're shopping online, just keeping in touch, playing this week's newest DVD or working on last year's annual report — the Presario 5000 Series includes all the essential features to make your work and play easier and more enjoyable. Plus, with ample expansion slots and accessible bays, you can always broaden your options.

Weight — 10

Additional Information

Field 1:
Field 2:
Field 3:
Field 4:
Field 5:

66
[Change Image] [Edit Product] [Delete Product]

| SKU | Name | Qty Avail | SKU Enabled | Rule | Channel |
|---|---|---|---|---|---|
| 1 | Pavilion 740n Minitower | 998 | Yes | Scheduled allocation (site rule) | FairMarket (1081) |
| 2 | Presario 5410US Minitower | 500 | Yes | Scheduled allocation (site rule) | FairMarket (1081) |
| 3 | VAIO RX640 Minitower | 2000 | Yes | Scheduled allocation (site rule) | FairMarket (1081) |
| 4 | Hewlett-Packard Pavilion zt1130 Notebook | 728 | Yes | Scheduled allocation (site rule) | FairMarket (1081) |
| 5 | Satellite 3005-S307 Notebook | 5000 | Yes | Scheduled allocation (site rule) | FairMarket (1081) |
| 8 | Olympus Camedia C-4040 4.0MP Digital Camera | 1589 | Yes | Scheduled allocation (site rule) | FairMarket (1081) |
| 9 | Olympus Camedia C-700 2.0MP Digital Camera | 3440 | Yes | Scheduled allocation (site rule) | FairMarket (1081) |
| 189794 | Olympus IS-200 QD SLR 35mm Camera | 98 | Yes | Scheduled allocation (site rule) | FairMarket (1081) |
| 1234 | Test Product | 100 | Yes | Scheduled allocation (site rule) | FairMarket (1081) |

FIG. 16

AUTOMATED LISTING MANAGEMENT

CROSS-REFERENCE TO RELATED APPLICATION

This application claims the benefit under 35 U.S.C. 119(e) of U.S. provisional application No. 60/306,828 filed on Jul. 20, 2001, and which is herein incorporated by reference.

COPYRIGHT NOTICE

Portions of the disclosure of this patent document contain material that is subject to copyright protection. The copyright owner has no objection to the facsimile reproduction by anyone of the patent document or patent disclosure as it appears in the Patent and Trademark Office patent file or records, but otherwise reserves all copyright rights whatsoever. Copyright FairMarket, Inc. 2001, 2002.

FIELD OF THE INVENTION

The invention relates to systems capable of managing surplus inventory, such as systems that optimize price for surplus goods or services.

BACKGROUND OF THE INVENTION

There are a variety of different types of network-based sales systems now in existence. A number of these implement the traditional English auction. This mechanism efficiently allocates individual lots by awarding them to the buyers who attribute the most value to them. But English auctions are not necessarily an optimum mechanism for selling larger quantities of goods, such as seasonal retail items, overstock, or discontinued merchandise, and these types of goods are therefore often sold using other types of electronic sales systems.

The simplest of these alternate systems strive to reproduce an in-store shopping experience in which goods are offered for sale at a particular non-negotiable markdown price. This approach requires sellers to gauge the demand for their products so that they can determine a price that is high enough to allow them an acceptable return, but not so high that few or no buyers will purchase them. This process can be difficult and time consuming, and may be too much so to be warranted for relatively small lots of goods. And setting a particular price can also allow some individuals who place a high value on an item to buy it for less than that value.

So-called Request-for-Proposal (RFP) systems allow buyers to place bids, which sellers can then choose to satisfy. These systems can allow sellers to provide the same goods to buyers who value them differently and thereby improve their profit levels. And although at least one system warns users against bids that are too low, such systems can be daunting to some buyers because they must thoroughly understand the value and demand for the item, or risk submitting bids that are too high.

Falling-price systems drop the price of goods over time until they are sold. Buyers can commit to buy early, or wait for a lower price at the risk of losing the item. At least one such system allows a user to pay a premium to place firm bids for later days using a so-called buyer's agent. Like RFP systems, falling-price systems can allow sellers to provide the same goods to buyers who value them differently. But they can also be daunting to some buyers, who must thoroughly understand the value and demand for the item, or risk submitting bids that are too high.

The network-based sales mechanisms described so far are by no means the only ones currently available to buyers and sellers. Others include Dutch auctions, sealed bid auctions, and classifieds. But no single one of all of these different mechanisms appears to present an optimum solution for selling larger lots of goods, such as seasonal retail items, overstock, or discontinued merchandise.

SUMMARY OF THE INVENTION

In one general aspect, the invention features a sales system for lots of items that includes business rule definition logic. The sales system also includes offering creation logic that is operative to dynamically create different offerings for items in the lots. The offering creation logic optimizes return based on one or more of the business rules by using different offering parameter values for the different offerings.

In preferred embodiments, the business rule definition logic can be operative to define rules based on a target cost recovery rate. The business rule definition logic can be responsive to user business rule creation commands. The offering creation logic can be operative to optimize return by adjusting lot price. The offering creation logic can be operative to optimize return by adjusting lot quantity. The offering creation logic can be operative to create offerings for a plurality of sales channels. The offering creation logic can be operative to adjust offerings on one of the sales channels based on results from another of the sales channels. The business rule definition logic can be operative to create rules that are dependent on results from prior offerings. The business rule definition logic can be operative to create rules that are dependent on margins from prior offerings. The price offering creation logic can be operative to create a series of auctions based on parameters determined by results from previous auctions. The business rule definition logic can be operative to create offerings based on absolute or relative amounts. The business rule definition logic can employ a web-based interface. The business rules can be set on a SKU, category, and site level. The system can further include default sales parameter creation logic operative to set sales parameters for the offerings. The sales parameter creation logic can be operative to set bidding parameters for an auction. The price offering creation logic can use exponential smoothing to derive parameters for the price offerings. The system can further include search logic operative to search for items in the lots. The system can further include falling price default logic operative to create fixed default falling price parameters. The system can further include scheduled allocation logic operative to create a scheduled set of offerings with predetermined parameters. The system can further include item display logic operative to display information about items in each of the lots with controls that allow the user to access the business rule definition logic for the item in the lot for which information is displayed. The system can further include a forecasting report generator operative to produce a report that forecasts future operation of the offering creation logic.

In another general aspect, the invention features a sales system for lots of items that includes means for defining machine-readable business rules and means for automatically creating a plurality of different offerings for items in the lots based on the machine-readable business rules defined by the means for defining. The means for automatically creating optimizes return based the machine-readable business rules defined by the means for defining using different offering parameter values for the different offerings.

In a further general aspect, the invention features a method of selling lots of items that includes defining machine-readable business rules and automatically creating a plurality of different offerings for items in the lots based on the machine-readable business rules. The step of automatically creating optimizes return based on the machine-readable business rules defined in the step of defining using different offering parameter values for the different offerings. Systems according to the invention can be beneficial in that they allow for the creation of rules that can be used to automatically liquidate lots of items. Once the rules are created, the user does not need to monitor the liquidation process any further. This makes the task of liquidating items more cost-effective than a manual approach might be. And rules may even perform better than would a human defining listings based on his or her subjective judgments.

DESCRIPTION OF THE DRAWING

FIG. 4 is a diagram illustrating a services page for the SIMS of FIG. 1;

FIG. 5 is a diagram illustrating a search page for the SIMS of FIG. 1;

FIG. 7 is a diagram illustrating a business rules default page for the SIMS of FIG. 1;

FIG. 8 is a diagram illustrating a business rules page for the SIMS of FIG. 1;

FIG. 9 is a diagram illustrating an override control for the SIMS of FIG. 1;

FIG. 10 is a diagram illustrating a reporting page for the SIMS of FIG. 1;

FIG. 12 is a diagram illustrating a scheduled allocation page for the SIMS of FIG. 11;

FIG. 13 is a diagram illustrating an item page for the SIMS of FIG. 11;

FIG. 15 is a diagram illustrating an item or product editing page for the SIMS of FIG. 11; and FIG. 16 is a diagram illustrating a rules report page for the SIMS of FIG. 11.

DETAILED DESCRIPTION OF AN ILLUSTRATIVE EMBODIMENT

Figure 1:
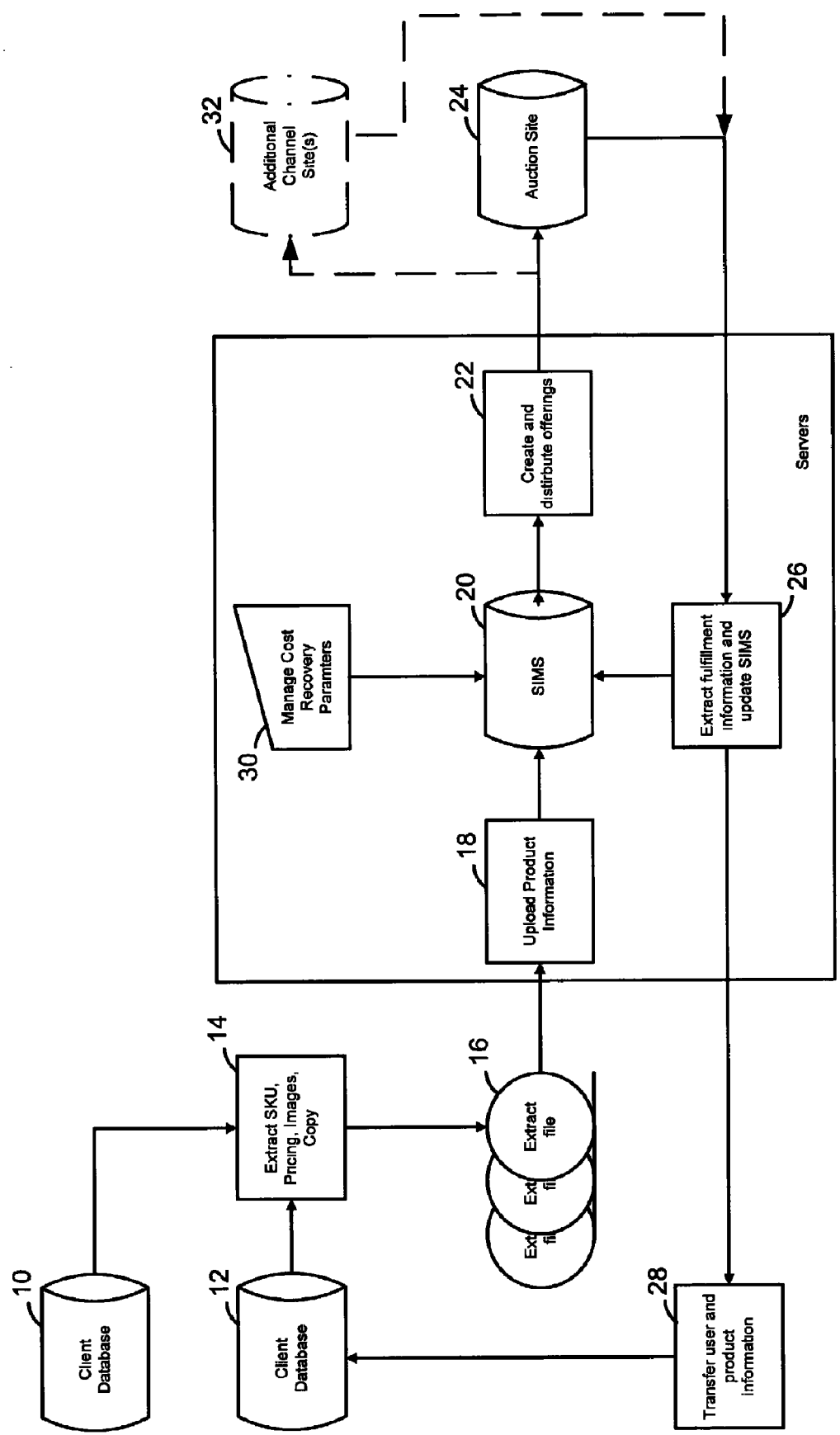
FIG. 1 is a block diagram generally illustrating the operation of an illustrative embodiment of a Surplus Inventory Management System (SIMS) according to the invention.

A Surplus Inventory Management System (SIMS) according to the invention is a logic driven re-listing and inventory management engine designed to handle all or some portion of the customer's excess inventory. It operates generally according to FIG. 1. SKU, pricing, images and copy are first extracted 14 from client databases 10, 12 into extract files 16 that allow product information to be uploaded into the SIMS 20. Offerings are created and distributed 22 based on the SIMS and can be sent to a sales site, such as an auction site 24. Fulfillment information can then be extracted and used to update the SIMS and user and product information can be transferred to the client database 12. Cost recovery parameters can be managed separately 30 though the SIMS.

The SIMS preferably should allow one or more customers to allocate surplus inventory into a centralized database that automatically relists items into an auction system, which can be run by an auction service provider, based up a set of predefined business rules. Suitable auction functionality is described in "Publishing System for Network-Based Sales," filed Nov. 16, 1999, issued Ser. No. 09/441,385, which is the basis for published PCT application no. PCT/US00/31542, entitled "Network-Based Sales System," filed Nov. 16, 2000, which are both herein incorporated by reference.

The SIMS preferably provides real-time reports and audits of upcoming listings as well as historical results of past listings. It also preferably displays a master scheduler report and exception report of all upcoming customer listings (quantity, retail value, predicted sell value) by category and date to help plan inventory allocation and forecast future revenue.

Listing flexibility is important for the SIMS since not all inventories may flow through the SIMS engine. Product data can be loaded into the SIMS database via text files, Microsoft Excel® files or an XML interface. A data validation procedure can ensure that the upload contains the proper fields and format. In this embodiment, the following fields are provided for:

Required Fields—Each Row Must Contain the Following
    SKU—A unique identifier for each product
    Category—Used to roll up aggregate data for reporting
    Quantity Available—Number of units available per SKU
    Cost Per Unit—Cost value per SKU
    Format—Auction, Falling Price Optional Fields—Data may be Excluded; Excluded Information Will Default to by Site or Category
    Image Reference
    Description
    Target Cost Recovery Rate—Ideal price each SKU should achieve.
    Starting Quantity—Default quantity of listing by SKU. Will allow for higher velocity of high inventory items.
    Start Date
    Starting Time
    End Time
    Bid Increment
    Reserve Price
    Rest Period—Days between Listing
    Listing Logic—Allows the customer to override business rules and move listings out in a linear fashion rather than iterating demand curve.
    Fixed Quantity—If business rules are overridden this field will dictate the number of items in each listing.

Figures 2, 3:
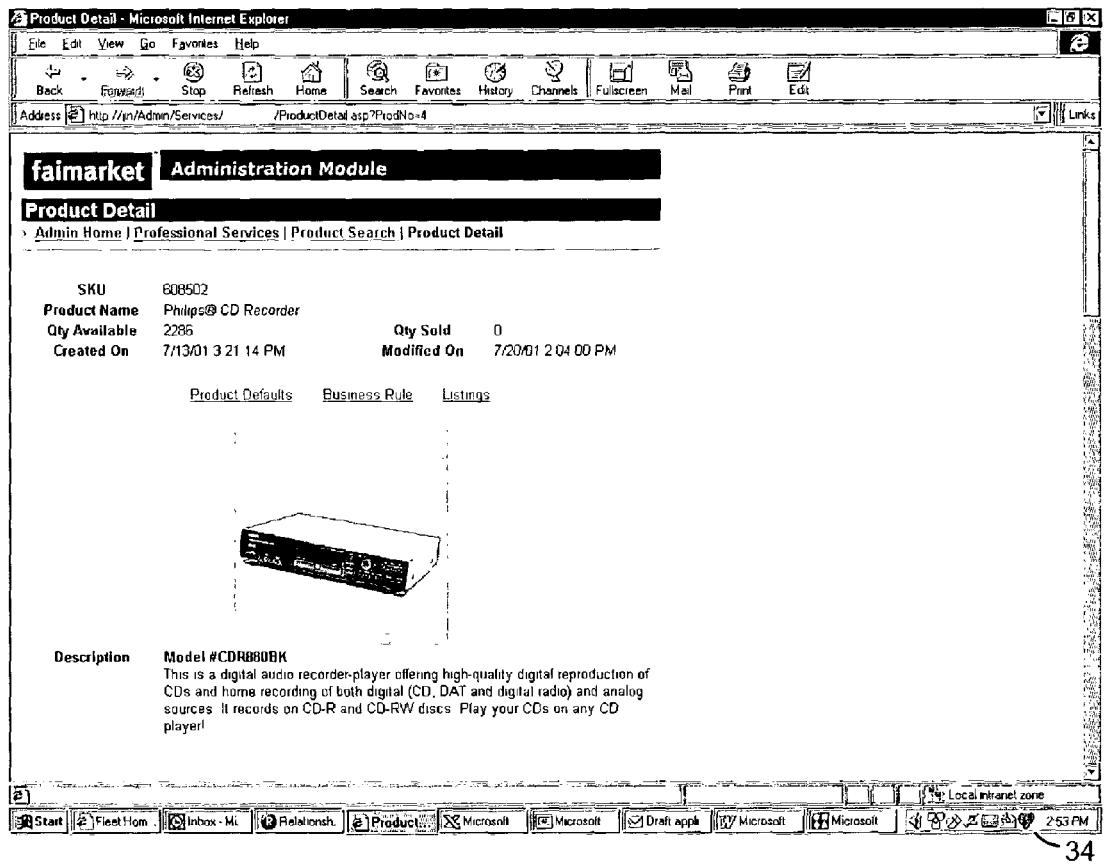
FIG. 2 is diagram illustrating an item or product page for the SIMS of FIG. 1.
FIG. 3 is a diagram illustrating a defaults page for the SIMS of FIG. 1.

Referring to FIG. 2, in addition to mass upload, a Hypertext Markup Language (HTML) interface can allow for manipulation by SKU. The HTML interface can provide (see also item page 34):
    New SKU and Inventory combination
    Updating Previous SKU and Inventory
    Search
    Add
    Delete
    Edit In addition to auctions, the SIMS can support listings in other pricing formats. For example, referring to FIG. 3, the SIMS can logically allocate inventories using a falling price auction model ("plunging prices") by using the format variable. The business rules can work in the same manner as auctions. The SIMS can control the reserve price and quantity dependent on margins.

No additional information is required for these channels except for predefined defaults. There can be a separate screen 36 to capture this default information. To increase upload efficiency, plunging price variables can be derived from auction variables and the default settings. This way, items can move between channels with the change of just the format parameter.

Fixed price listings can be managed through the same process. The fixed price listing can be priced at some percent of cost and applied at the SKU, category, or site level. This channel can also be open to use other systems, such as a demand based pricing engine described in "Sales System With Sales Activity Feedback," Ser. No. 09/686,073, and "Sales System With Buyer Price Selection," Ser. No. 09/685,449, both filed on Oct. 11, 2000 and herein incorporated by reference.

Referring again to FIG. 1, the SIMS can also have the ability to automatically move inventory into other channels 32 such as another web auction provider or B2B channels. The customer can have the same fulfillment process with the SIMS as before. The SIMS can use that current report to allocate/de-allocate inventory. No additional work is needed to fulfill based on the SIMS listings.

The SIMS can have scheduling reports that forecast future lots, quantities and sales based on the most current information. For example, a lot of 100 camcorders that have a duration of one week, and assuming movement of 10 units a week, would show 10 lots of quantity 10 for the next ten weeks with the corresponding sales forecast. This should help the customer plan and schedule inventory more efficiently.

Referring to FIG. 4, the customer can interact with the SIMS via an administrative back end that is also used for auctions, but also includes an additional professional services link. Alternatively, the functionality could be provided in a dedicated software product. The administrative back end can provide a services page 38 that includes links for the SIMS, including a mass upload link, a search link, a reporting link, and a manage business rules link.

Referring to FIG. 5, the customer can search for SIMS listings with a search page 40 using the following criteria:
    SKU
    Quantity Available
    Creation Date
    Category
    Target Cost Recovery Rate
    Title Each SKU can be editable in real-time by the following criteria:
    Quantity Available
    Target Cost Recovery
    Start Time
    End Time
    Bid Increment
    Rest Period
    Pricing Format Open listings may not be modified expect in standard methods (close a listing, description edits).

The rules engine can be set at the site, category or SKU level. Defaults will be set by the same level structure such that any omitted field in the business logic will default to the next highest level. For example, if the target cost recovery rate is omitted for a Panasonic camcorder, it will default to electronics' cost recovery rate. If that is omitted, it will default to the site cost recovery rates. All business rules will have the same default logic resulting in rules that are as specific as necessary.

Figure 6:
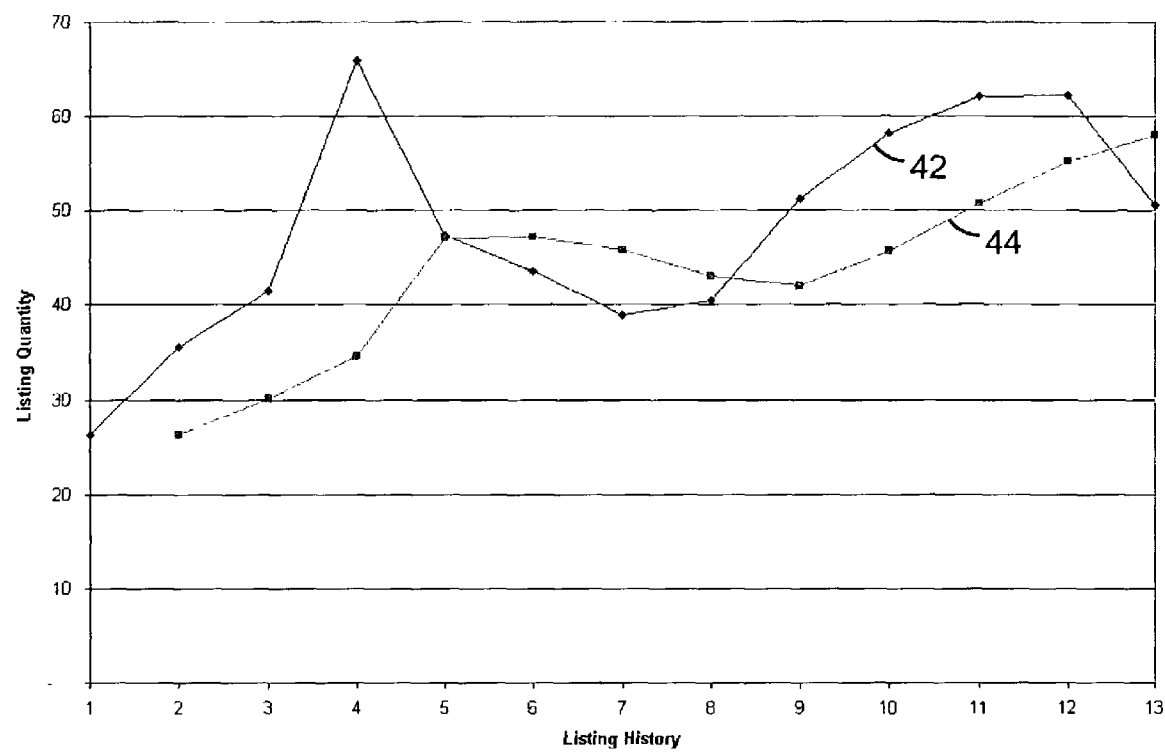
FIG. 6 is an illustrative plot of listing quantity against listing history for the SIMS of FIG. 1.

Referring to FIG. 6, two modes are available. In a first mode (mode one), cost recovery of last listing will be used (see e.g., curve 42). In a second mode (mode two), exponential smoothing may be used if necessary (see, e.g., curve 44). Exponential smoothing eliminates the relative peaks and valleys of demands. It works by weighting past results with different coefficients to make less drastic changes in lot quantities.

A sample business objective could be to maximize total sales subject to inventory and a 50% cost-dollar recovery rate. This objective could employ the following business rules:
    Starting bid is always $1
    List duration is always 4 days
    Auctions always start at 1:00 AM (EST) and end at 10:00 PM (EST)
    If cost recovery is greater than 50%, then increase quantity of the next listing by 1
    If cost recovery is between 42-50%, then keep quantity of next listing constant
    If cost recovery is less than 40%, then decrease quantity of next listing by 1

Based on the customer's empirical data of "8pc. Venetian Scallop Towels—White," for example, the SIMS could have produced the results shown in Tables 1 and 2.

TABLE 1

| Item | Quantity | | |
|---|---|---|---|
| | 1 | 2 | 3 |
| 8 pc. Venetian Scallop Towels-White | 69.76% | 51.03% | 41.22% |

TABLE 2

| Step | Input | SIMS Action |
|---|---|---|
| 1. | Upload nine (9) 8 pc. Venetian Scallop Towels - White | Create a test listing of quantity 1. Allocate 1 unit to "reserve" status leaving 8 units available in the SIMS. |
| 2. | Test listing closes for 69.76% cost recovery. | De-allocate 1 unit from "reserve" status, since item is sold. Evaluate cost recovery rate. Based on business rules increase quantity to 2 units. Allocate 2 units to "reserve" status leaving 6 units available in the SIMS. Create a listing for Qty 2. |
| 3. | Listing close for 51.03% cost recovery | De-allocate 2 units from "reserve" status Evaluate cost recovery rate. Increase quantity to 3 units. Allocate 3 units to "reserve" status leaving 3 units available in the SIMS. Create a listing for Qty 3. |
| 4. | Listing close for 41.22% cost recovery | De-allocate 3 units from "reserve" status. Evaluate cost recovery rate. Keep quantity of 3. Allocate 3 units to "reserve" status leaving 0 units available in the SIMS. Create a listing for Qty 3. |
| 5 | Listing close for 41.22% cost recovery | De-allocate 3 units from "reserve" status. Evaluate cost recovery rate. Keep quantity of 3. Check available quantity. No More Quantity. Stop. |

Referring to FIG. 7, the customer can control the following variables by static input (i.e., no logic need be used to derive the settings), at the SKU, category, and site level, using a business rules default page 46.

Opening Time (Hour/Min)
Closing Time (Hour/Min)
Bid Increment
Opening Bid
Duration (Days)
Rest Period Referring to FIG. 8, logic rules may be based on a set quantity and margin relationship using a business rules page 48. The logic can be set at the SKU, category, or site level. Depending on the margin of one or more previous listings, the size of the next lot will change by either an absolute number or a relative percentage.

In order to maintain control over inventory, a stop rule can allow the customer to stipulate a condition where no more listings will be placed by the SIMS. The system can report on these items individually. The stop rule should work under at least the following conditions: stop at predetermined quantity, stop at target recovery rate, stop on predetermined date. This feature is designed to help eliminate poor performing inventory. These items may then be moved from the SIMS and liquidated at $0.30 on the cost dollar. Stop logic may be implemented to work at the site level only.

Referring to FIG. 9, in the event that a customer decides to move items out at certain velocity regardless of margins, the auction service provider can provide override (linear quantity) functionality, which can be accessed through an override control 50. For example, if there are 10,000 SKUs, the customer may simply list 500 item lots over the next 20 weeks at a default duration of one week each.

Referring to FIG. 10, to maintain the integrity of the SIMS both daily audit reports and customer request reports can be made available, such as through a reporting page 52. Daily reports can be available by SKU, category, and site that detail the performance of previous day's closing items. When the logic engine evaluates the next set of listing quantities, the margins should be stored in a flat file that can be rolled up by category and site. An example report is shown in Table 3.

TABLE 3

Cost Recovery By Category By Day

| Base Category | 6/1 | 6/2 | 6/3 | 6/4 | 6/5 | 6/6 | 6/7 | 6/8 | 6/9 | 6/10 | Total |
|---|---|---|---|---|---|---|---|---|---|---|---|
| Books | 51% | 50% | 49% | 48% | 45% | 50% | 51% | 60% | 50% | 52% | 51% |
| computers | 51% | 51% | 50% | 49% | 48% | 45% | 50% | 51% | 60% | 50% | 51% |
| seasonal | 49% | 51% | 52% | 48% | 56% | 50% | 51% | 51% | 52% | 42% | 50% |
| Apparel-accessories | 51% | 51% | 50% | 49% | 48% | 45% | 50% | 51% | 60% | 50% | 51% |
| Home assortment | 49% | 51% | 52% | 48% | 56% | 50% | 51% | 51% | 52% | 42% | 50% |
| Auto-hardware | 51% | 51% | 50% | 49% | 48% | 45% | 50% | 51% | 60% | 50% | 51% |
| electronics | 49% | 51% | 52% | 48% | 56% | 50% | 51% | 51% | 52% | 42% | 50% |
| Toys | 51% | 51% | 50% | 49% | 48% | 45% | 50% | 51% | 60% | 50% | 51% |
| Office | 49% | 51% | 52% | 48% | 56% | 50% | 51% | 51% | 52% | 42% | 50% |
| Sports-outdoors | 51% | 51% | 50% | 49% | 48% | 45% | 50% | 51% | 60% | 50% | 51% |
| b2b-business | 54% | 51% | 52% | 48% | 56% | 50% | 51% | 51% | 52% | 42% | 51% |
| Grand Total (All dates in 2001) | 51% | 51% | 51% | 48% | 51% | 48% | 51% | 52% | 55% | 47% | 50% |

Exception reports can also be made available. This type of report will display the numbers of available items each day to help manage site breadth (see Table 4). It can work by evaluating current inventory levels, the current velocity of that inventory, and forecasting item sales with the most recent information. This evaluation can be governed by the following relationships.

Number of Listings Remaining=Current Inventory/Current Lot Size

Expected Sell Out Date=Number Of Listings Remaining* (Duration+Rest

TABLE 4

Item Open Per Day

| Base Category | 6/1 | 6/2 | 6/3 | 6/4 | 6/5 | 6/6 | 6/7 | 6/8 | 6/9 | 6/10 | Total |
|---|---|---|---|---|---|---|---|---|---|---|---|
| Books | 12 | 17 | 20 | 21 | 18 | 19 | 20 | 23 | 16 | 15 | 181 |
| computers | 16 | 14 | 15 | 17 | 20 | 21 | 18 | 19 | 20 | 23 | 183 |
| seasonal | 15 | 17 | 20 | 21 | 18 | 19 | 20 | 23 | 16 | 14 | 183 |
| Apparel-accessories | 14 | 17 | 20 | 21 | 18 | 19 | 20 | 23 | 16 | 22 | 190 |
| home assortment | 21 | 24 | 29 | 30 | 26 | 27 | 29 | 33 | 23 | 21 | 263 |

TABLE 4-continued

Item Open Per Day

| Base Category | 6/1 | 6/2 | 6/3 | 6/4 | 6/5 | 6/6 | 6/7 | 6/8 | 6/9 | 6/10 | Total |
|---|---|---|---|---|---|---|---|---|---|---|---|
| auto-hardware | 14 | 13 | 17 | 20 | 21 | 18 | 19 | 20 | 23 | 16 | 181 |
| electronics | 20 | 22 | 26 | 27 | 23 | 25 | 26 | 30 | 21 | 20 | 239 |
| Toys | 15 | 17 | 20 | 21 | 18 | 19 | 20 | 23 | 16 | 15 | 184 |
| Office | 12 | 15 | 17 | 20 | 21 | 18 | 15 | 17 | 20 | 21 | 176 |
| sports-outdoors | 12 | 9 | 17 | 20 | 21 | 18 | 19 | 20 | 23 | 16 | 175 |
| b2b-business | 17 | 20 | 21 | 18 | 19 | 20 | 23 | 16 | 13 | 10 | 177 |
| Grand Total (All dates in 2001) | 168 | 185 | 222 | 236 | 223 | 223 | 229 | 247 | 207 | 193 | 2,132 |

A sales forecasting report can be made available as well (see Table 5). Based on the exception report and the margin reports, the sales forecast report can give estimates of future sales by category given current recovery rates and inventory supplies. This evaluation can be governed by the following relationship.

Forecast Sales=Audit Report*Exception Report*Average Cost by Category bers of items through different channels, using mode 1, mode 2, or a combination of the two. For example, the user can attempt to sell a large number of items though its own web site using a price optimization rule and attempt to sell smaller quantities through third party systems using scheduled allocation rule.

Feedback can be provided within a channel and/or between channels. If listings on a first channel stop doing well, for

TABLE 5

Forecasted Sales (Based on Past Recovery History)

| Base Category | 6/1 | 6/2 | 6/3 | 6/4 | 6/5 | 6/6 | 6/7 | 6/8 | 6/9 | 6/10 | Total |
|---|---|---|---|---|---|---|---|---|---|---|---|
| books | 54 | 77 | 90 | 95 | 81 | 86 | 90 | 104 | 72 | 68 | 815 |
| computers | 10000 | 8750 | 9375 | 10625 | 12500 | 13125 | 11250 | 11875 | 12500 | 14375 | 114375 |
| seasonal | 525 | 595 | 700 | 735 | 630 | 665 | 700 | 805 | 560 | 490 | 6405 |
| apparel-accessories | 364 | 442 | 520 | 546 | 468 | 494 | 520 | 598 | 416 | 572 | 4940 |
| home assortment | 965 | 1094 | 1287 | 1351 | 1158 | 1223 | 1287 | 1480 | 1030 | 965 | 11840 |
| auto-hardware | 1470 | 1365 | 1785 | 2100 | 2205 | 1890 | 1995 | 2100 | 2415 | 1680 | 19005 |
| electronics | 2243 | 2542 | 2990 | 3140 | 2691 | 2841 | 2990 | 3439 | 2392 | 2243 | 27508 |
| toys | 315 | 357 | 420 | 441 | 378 | 399 | 420 | 483 | 336 | 315 | 3864 |
| office | 2400 | 3000 | 3400 | 4000 | 4200 | 3600 | 3000 | 3400 | 4000 | 4200 | 35200 |
| sports-outdoors | 1020 | 765 | 1445 | 1700 | 1785 | 1530 | 1615 | 1700 | 1955 | 1360 | 14875 |
| b2b-business | 3825 | 4500 | 4725 | 4050 | 4275 | 4500 | 5175 | 3600 | 2925 | 2250 | 39825 |
| Grand Total (All dates in 2001, all amounts in dollars) | 23181 | 23486 | 26737 | 28782 | 30371 | 30352 | 29042 | 29583 | 28601 | 28517 | 278652 |

Figure 11:
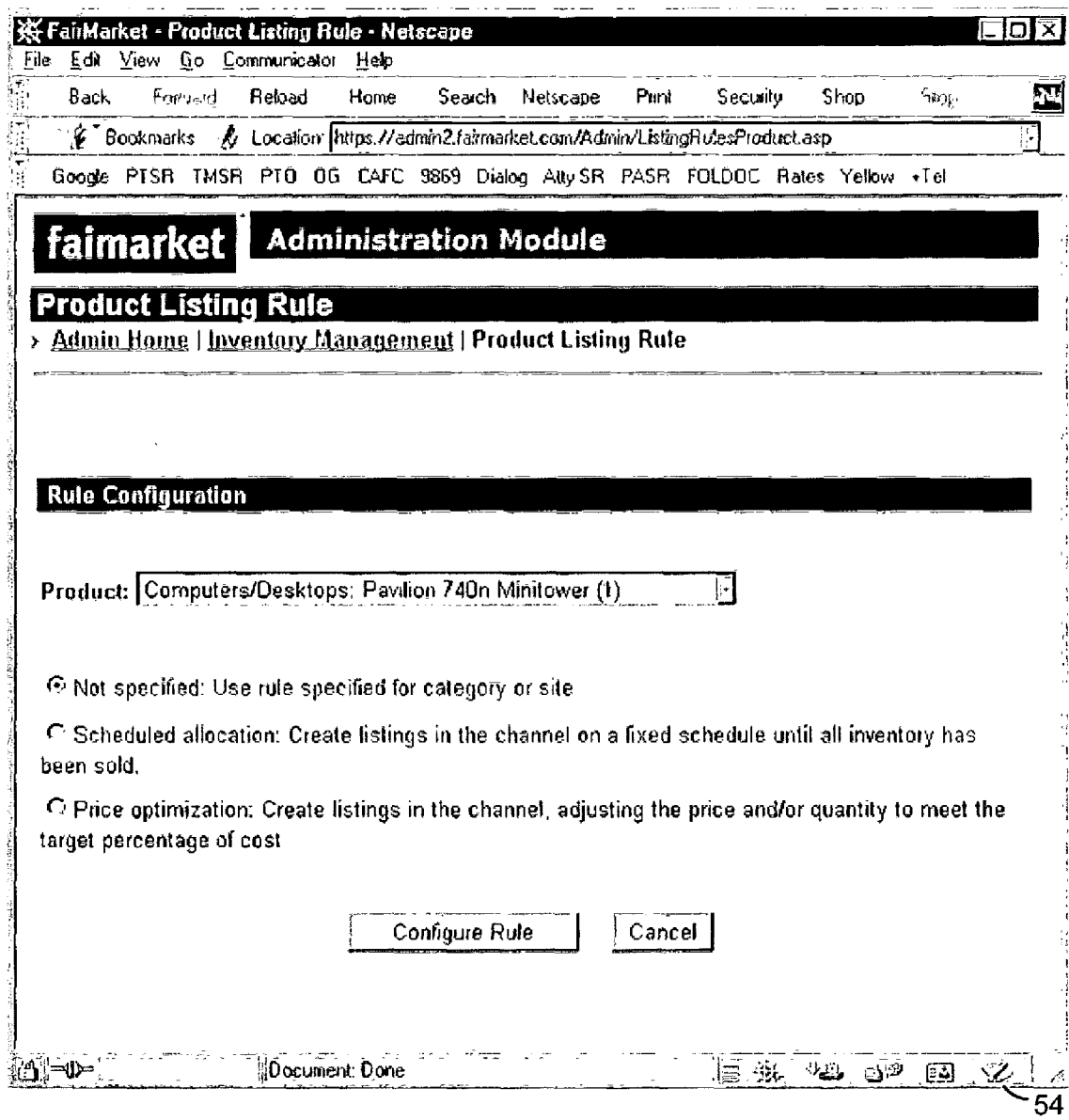
FIG. 11 is a diagram illustrating an item page for an another embodiment of the SIMS system of FIG. 1.

Referring to FIG. 11, an alternative illustrative embodiment of a SIMS includes a product listing rule page 54 that can be reached through the item page and allows users to select between three types of rules. The first type is an unspecified type, which allows the item to be treated according to default site or category rules. The second type is a scheduled allocation type, which allows the user to reach a scheduled allocation rule page 56. The third is a price optimization type, which can operate in much the same way as is presented above in connection with the embodiment of FIGS. 1-10.

Figure 12:
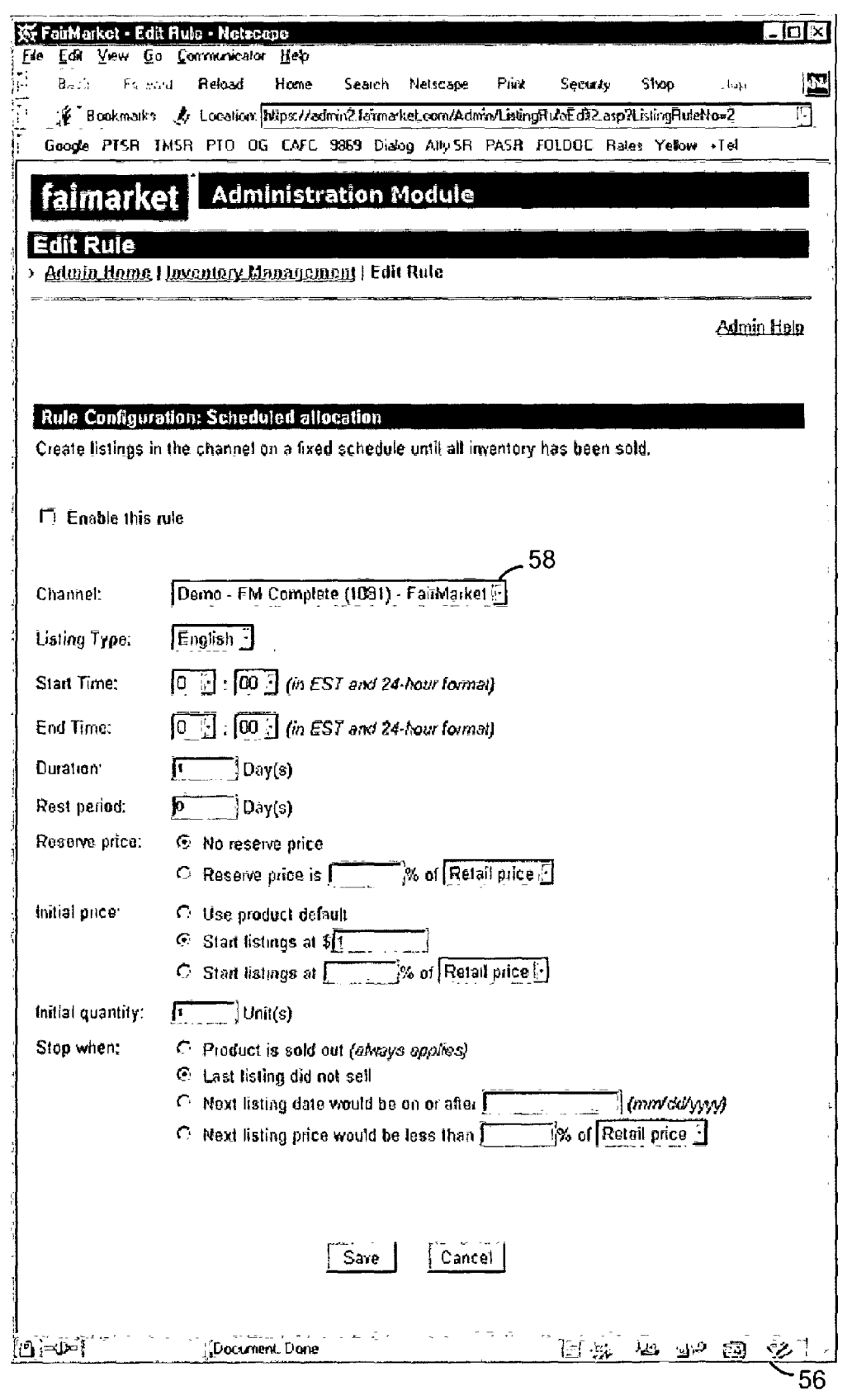

Referring to FIG. 12, the scheduled allocation page 56 includes a channel selection control 58, which enables a user to select a channel for which the rule is to be edited. This control can allow different rules to be created to operate simultaneously for different channels. Using this control, a user can therefore simultaneously try to sell different numexample, the SIMS can reduce the lot size on that channel and increase it on one or more other channels. For instance, a user could create a rule that would cause listings to be generated on a home site for 20 days, and then cause the remaining inventory to be liquidated through an auction provider.

The scheduled allocation page includes a number of additional controls to specify scheduled allocation parameters, such as a listing type text box, start and end text boxes, a duration text box, a rest period text box, a reserve price text box, an initial price text box, and an initial quantity text box. A compound stop control is also provided to specify a stop condition. Using the scheduled allocation page, a user can, for example, create a series of weekly eight-hour auction listings with identical predetermined opening and reserve prices, with listings being posted until all product is sold out. Although this type of liquidation schedule does not exhibit performance feedback, it is believed to provide a straightforward and useful way to schedule the liquidation of some types of lots of items.

Referring to FIG. 13, an item page 60 in this embodiment includes product information and a number of controls. These controls include a compound listing placement control 62 with a channel selection control and a submit button. The listing placement control allows the user to simply list one or more items through one of the channels.

Figure 14:
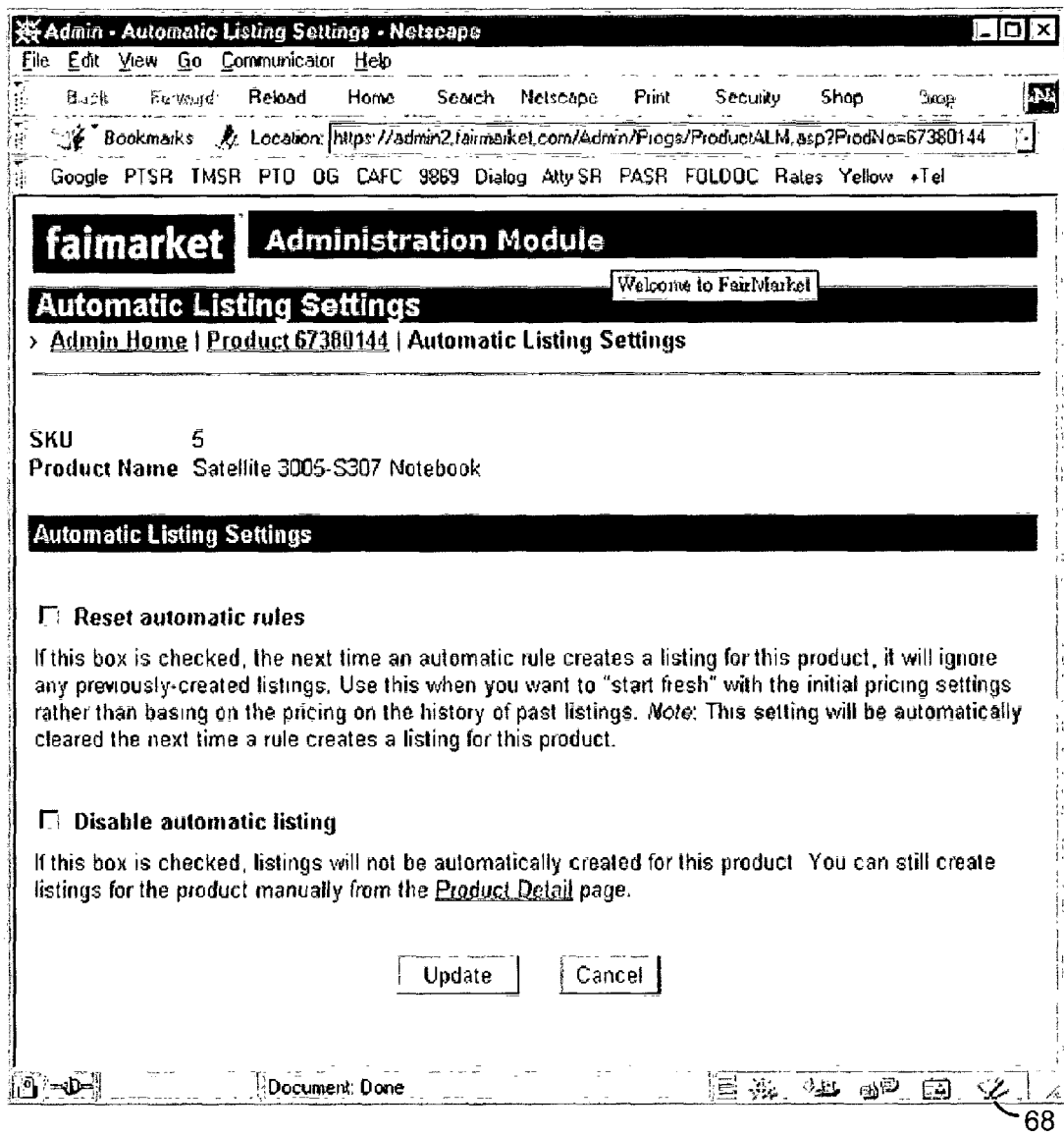
FIG. 14 is a diagram illustrating an automatic listing settings page for the SIMS of FIG. 11.

Referring also to FIG. 14, an edit automatic listing settings link 64 in the item page 60 can lead the user to an automatic listings settings page 68. This page can allow users to reset or disable automatic rules for an item. Resetting the automatic rules will cause the system to ignore any previously-created listings the next time an automatic rule creates a listing for the item. This allows the item to start fresh with initial price settings rather than basing its price on a past price history. Disabling rules prevents listings from being created automatically, but does not delete item-level rules. The user can therefore undo this command to reinstate an automatic rule.

Figure 15:
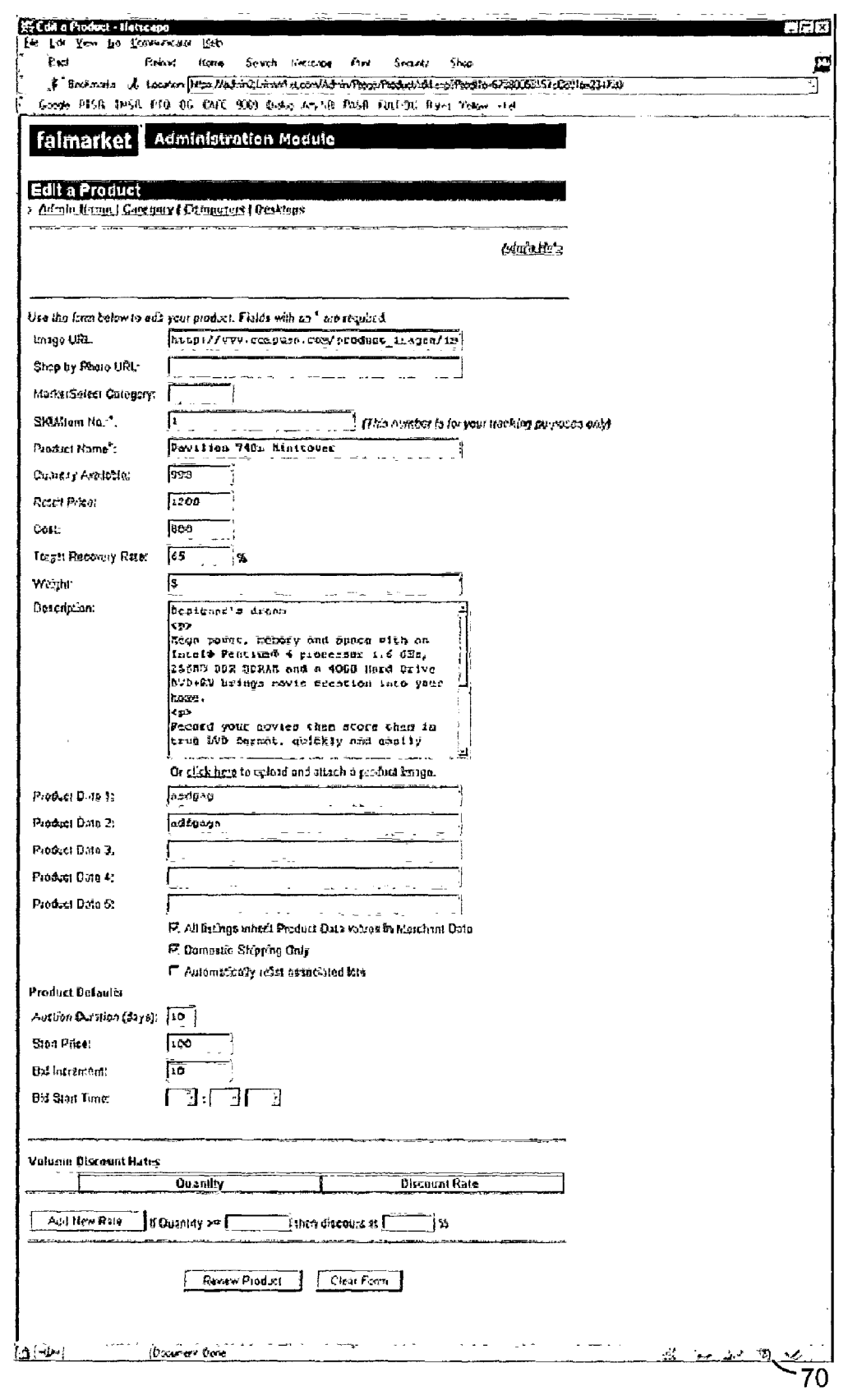

Referring also to FIG. 15, an edit item button 66 on the item page 60 can lead the user to an item edit page 70. This page includes a number of controls that allow the user to provide information about the item. This information can include item description items and sales parameters. The item description items can include a product name, an item number/SKU, an image location, a shipping weight, and a description. The sales parameters can include the quantity available, the retail price, the cost, and the target recovery rate. The sales parameters can also include default auction durations, start prices and bid increments.

Referring to FIG. 16, a rules report can be used to summarize all of the rules for a series of items. This report can include links to the item pages and to the corresponding rules for those pages. Links can also be provided to a site listing rule page that allows the default site listing rule type to be set to use price optimization rules or scheduled allocation rules.

In the embodiment presented, users interact with the server via hypertext transfer protocol (HTTP) over the span of one or more network connections. But numerous other platform technologies could be used to implement part or all of the system, such as dedicated hardware devices or simpler programmable devices interconnected by wireless or analog networks. Connections between elements can be intermittent (e.g., e-mail connections) or indirect. The function and structure of the various elements shown can also be broken down in different ways than those shown in figures, with logic elements being combined, separated, or recast as appropriate. And while the system's user interface is based on software-based graphical user interface elements, these could be readily rearranged in a variety of ways, and the user interface could even include other implementation elements, such as physically actuated controls or auditory prompts. In addition, while the system's user interface elements are presented as displayed in pages, one of ordinary skill in the art would recognize that they could also be displayed in other types of display regions, such as screens, cards, or windows. And while the system is useful in liquidating surplus product inventory, it can also be used for other types of transactions for a variety of types of items, such as services or even intangible items.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A system, comprising:
one or more servers to execute:
business rule definition logic to define at least one business rule; and
offering creation logic to dynamically create a plurality of different listings on a network-based sales system, the plurality of listings to respectively offer a lot that includes at least one item, the offering creation logic to optimize a financial return for the plurality of listings based on the at least one business rule that is operatively used to adjust offering values included in the respective listings, the offering creation logic is to adjust a first offering value in a first listing of the plurality of listings and a second offering value in a second listing of the plurality of listings, the offering creation logic is to adjust the second offering value in the second listing based on sales results of the first listing.

2. The system of claim 1 wherein the business rule definition logic is to define the at least one business rule based on an optimal price for each of the at least one items, wherein the plurality of listings is associated with a plurality of items, and wherein the optimal price for each of the at least one items is configured as a target cost recovery rate that is a percentage of a cost for each of the at least one items.

3. The system of claim 1 wherein the business rule definition logic is responsive to user business rule creation commands.

4. The system of claim 1 wherein the first offering value is a selling price of a first lot described in the first listing.

5. The system of claim 1 wherein the second offering value is a quantity of items in a second lot described in the second listing.

6. The system of claim 1 wherein the offering creation logic is to create the plurality of listings for a plurality of sales channels.

7. The system of claim 6 wherein the second listing is created for a second sales channel based the first listing that is created for a first sales channel.

8. The system of claim 1 wherein the business rule definition logic is to create the at least one business rule based on results from prior listings.

9. The system of claim 8 wherein the results from prior listings includes financial margins from prior listings.

10. The system of claim 1 further including a forecasting report generator to produce a report that forecasts future operation of the offering creation logic.

11. The system of claim 1 further including item display logic to display information about the at least one item included in the first and controls that allow the user to access the business rule definition logic for the at least one item.

12. The system of claim 1 further including scheduled allocation logic to create a scheduled set of listings with predetermined parameters.

13. The system of claim 1 further including falling price default logic to create fixed default falling price parameters.

14. The system of claim 1 further including default sales parameter creation logic to set sales parameters for the offerings.

15. The system of claim 14 wherein the sales parameter creation logic is to set bidding parameters for an auction.

16. The system of claim 1 wherein the price offering creation logic uses exponential smoothing to derive parameters for the price offerings.

17. The system of claim 1 further including search logic to search for the at least one item.

* * * * *

UNITED STATES PATENT AND TRADEMARK OFFICE
CERTIFICATE OF CORRECTION

| | |
|---|---|
| PATENT NO. | : 7,883,002 B2 |
| APPLICATION NO. | : 10/201586 |
| DATED | : February 8, 2011 |
| INVENTOR(S) | : Hua-Ming Jin et al. |

It is certified that error appears in the above-identified patent and that said Letters Patent is hereby corrected as shown below:

On page 3, under "Other Publications", in column 1, line 57, delete "Appl.l" and insert -- Appl. --, therefor.

On page 3, under "Other Publications", in column 2, line 35, delete "Jun. 20 2005" and insert -- Jun. 20, 2005 --, therefor.

On page 3, under "Other Publications", in column 2, line 39, delete "Oct. 27 2009" and insert -- Oct. 27, 2009 --, therefor.

On page 3, under "Other Publications", in column 2, line 51, delete "v No." and insert -- U.S. Appl. No. --, therefor.

On Sheet 1 of 14, Box 30, Figure 1, line 3, delete "Paramters" and insert -- Parameters --, therefor.

On Sheet 1 of 14, Box 22, Figure 2, line 2, delete "distirbute" and insert -- distribute --, therefor.

In column 8, line 53, after "Rest" insert -- Period) + Today's Date --.

In column 9-10, line 21, delete "indollars) and insert -- in dollars) --, therefor.

In column 12, line 37, in Claim 7, after "based" insert -- on --.

In column 12, line 49, in Claim 11, after "first" insert -- lot --.

Signed and Sealed this
Twenty-sixth Day of April, 2011

David J. Kappos
*Director of the United States Patent and Trademark Office*